March 15, 1932.  G. LIPSHITZ  1,849,939
CAMERA
Filed April 21, 1928    2 Sheets-Sheet 1
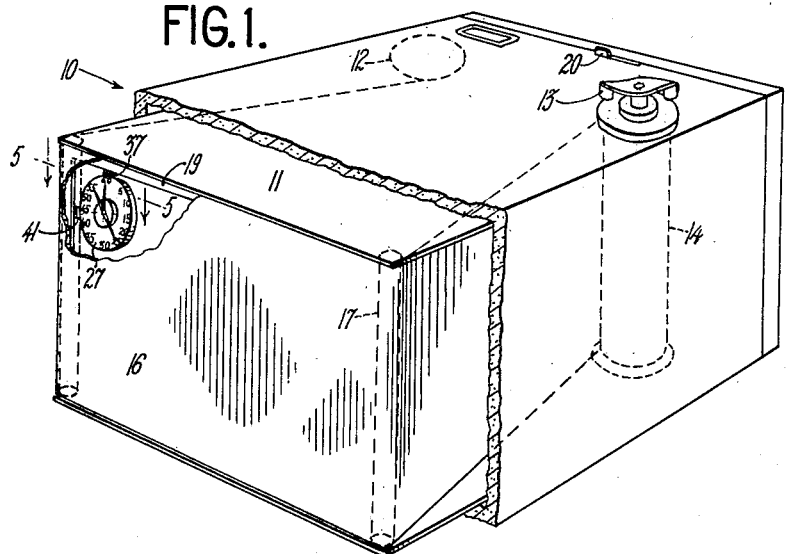
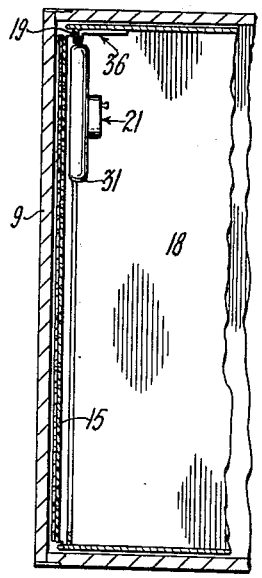
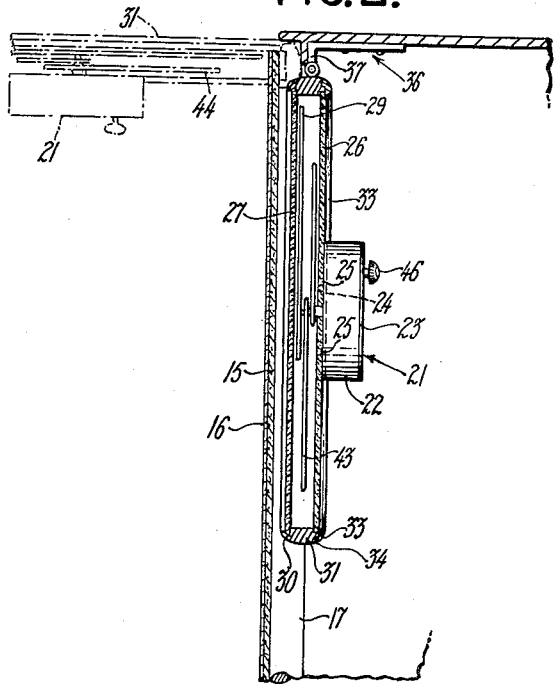
GEORGE LIPSHITZ, INVENTOR
WITNESS:

March 15, 1932.  G. LIPSHITZ  1,849,939
CAMERA
Filed April 21, 1928   2 Sheets-Sheet 2

GEORGE LIPSHITZ,
INVENTOR:
BY Victor J. Evans,
ATTORNEY.

WITNESS:

Patented Mar. 15, 1932

1,849,939

UNITED STATES PATENT OFFICE

GEORGE LIPSHITZ, OF BRONX, NEW YORK, ASSIGNOR OF ONE-HALF TO HENRY HAAS, OF EDGEWATER, NEW JERSEY

CAMERA

Application filed April 21, 1928. Serial No. 271,883.

This invention relates to cameras and particularly to means for producing a photographic record of the exact time of the occurrence of an event taken by the camera.

One object of the invention is to provide means for producing a visible record of the time of the start and finish of a sporting event such as a horse race or the like.

At some sporting events a visible starting signal is provided for operation simultaneously with an audible signal, therefore another object of the invention is to provide means for obtaining, with a photographic record of the visible starting signal, a photographic record of the exact time of the commencement of the race.

It follows that with a photograph of the starting time of an event, such as a race, and with a photograph of the finishing time of the race, an indisputable time record of the event is available, including the exact time consumed by the race.

A feature of the invention is a novel watch comprising a relatively small case containing the usual mechanism, and a large fixedly associated frame within which the hands move, and on the transparent face of which the usual numerals are arranged. The numerals on the dial are outside of the peripheral boundary of the case containing the mechanism, and are therefore available for being photographed on the negative, with the subject, since said dial and said case are installed within a camera.

Other features and advantages will hereinafter appear.

In the accompanying drawings:—

Figure 1 is a perspective view of a camera partly broken away, and showing the invention attached within the roll holder of the camera.

Figure 2 is an enlarged vertical section taken through the dial frame and adjacent parts of the roll holder, and showing also the mechanism case.

Figure 3 is a vertical sectional view of a part of the camera, showing the position of the invention therein.

Figure 4:
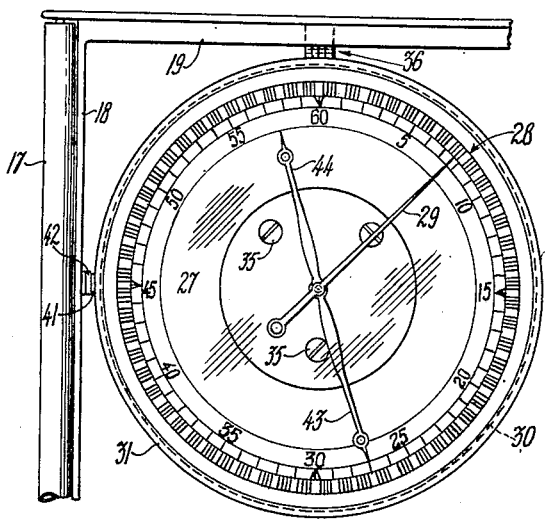
Figure 4 is a face view of the graduated dial.
Figure 5:
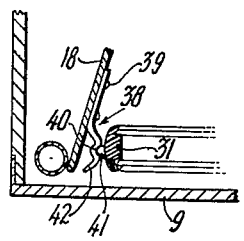
Figure 5 is a section on the line 5—5 of Figure 1 looking in the direction of the arrows.
Figure 6:
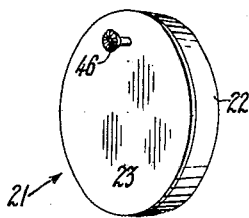
Figure 6 is a perspective view of the mechanism case per se.
Figure 7:
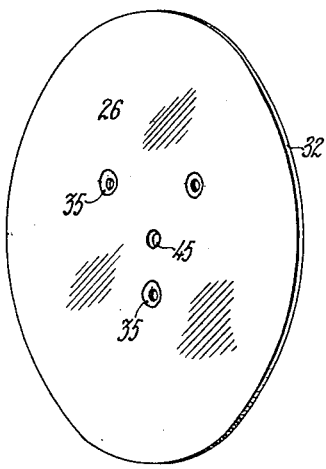
Figure 7 is a perspective view of a transparent disc separate from the mechanism case.

Referring particularly to the drawings, a camera 10 of any well-known construction comprises a roll holder 11 carrying a supply spool 12 and adapted to be unwound by a key 13 operatively connected to a winding spool 14. A roll of sensitized film 15 with a paper guard 16 is adapted to be wound from the spool 12 to the spool 14 and which pass over guide rollers 17 during passage from one spool to another. An openable end wall is indicated at 9.

The roll holder comprises side walls 18 and interposed flanges 19 above and below the open rear end which is closed by the film and its guard. Instrumentalities controlled by a lever 20 at the front of the camera admit light to project the image of the subject on the film in the usual well-known manner.

I provide within the camera a watch 21 comprising a ring 22, a rear plate 23 and a base plate 24, within which the usual mechanism is housed. To accommodate the present invention, the winding stem carrying a crown 46 projects through the rear plate 23. Secured to the base plate 24 by screws 25 there is a transparent disc 26 preferably of celluloid, while another transparent disc or dial 27 carries numerals representing the hours and minutes, and a scale 28 graduated to fifths of seconds to co-operate with a second hand 29.

The dial is formed with a bevelled edge 30 which fits in an appropriate groove on one side of a circular frame 31, while the other side of said frame is suitably formed to receive the peripheral edge 32 of the disc 26, which is also provided with holes 35, to receive the screws 25, and a central aperture 45. Snugly embracing said disc at its edge there is a ring 33 which fits tightly at 34 on said frame.

With the dial adjacent to and facing the film, the watch is swingably hinged to a bracket 36 which is attached to the roll and which has an angular ear 37 to allow of free movement of the watch to an inoperative position as shown in dot and dash lines in Figure 2, so that the watch may be conveniently wound or set.

A leaf spring 38 having a bend or transverse groove 40 therein is secured at 39 to the wall 18 of the roll holder. The frame 31 has, rigid therewith, an outstanding teat 41, the rounded edges of which permit the same to slide along the inclined terminal 42 of the leaf spring and enter said groove to hold the watch securely in its operative position within the camera.

It will be seen that the position of the watch is opposite a corner of the section of the film that is positioned for exposure. When light is admitted to the camera, on operation of the lever 20, the shadow of the scale 28, hand 29, minute hand 43 and hour hand 44 are negatively received on the film 15 and show positively on the photograph when printed in the usual way.

Figure 8:
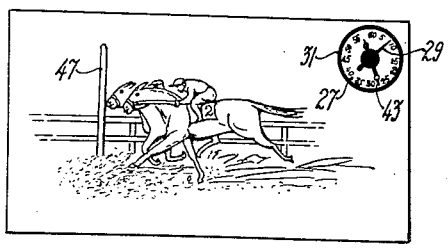
Figure 8 is a view of a photograph of the finish of a race taken by my improved camera.

It follows therefore, that since the hands are outside of the boundary of the case 28, the accurate time at which an event is photographed is recorded on the finished print. The panel shown at Figure 8 represents the finish of a race, with the leading competitor just at the winning post 47, at exactly twenty seven minutes and three fifths seconds past eleven o'clock.

It will be understood that, while I have illustrated and described the preferred form of my invention, certain variations may be resorted to, that certain parts may be used without others, the second hand, for instance, may be used without the other hands, and that the scope of the invention is only to be limited by the appended claim, which should be interpreted accordingly.

What is claimed as new is:—

In a camera comprising a roll holder, a time piece within the roll holder, embodying a case of restricted diameter for the mechanism of the time piece, hands projecting beyond the peripheral edge of said case, and a transparent dial to co-operate with said hands.

In testimony whereof I have affixed my signature.

GEORGE LIPSHITZ.